United States Patent
Nee et al.

(10) Patent No.: US 8,947,032 B2
(45) Date of Patent: Feb. 3, 2015

(54) SYSTEM AND METHOD FOR ESTIMATING THE POSITION OF A WOUND ROTOR SYNCHRONOUS MACHINE

(71) Applicant: Electro-Motive Diesel, Inc., LaGrange, IL (US)

(72) Inventors: Brett Michael Nee, Germantown Hills, IL (US); Garrett Tyler Nielson, Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 238 days.

(21) Appl. No.: 13/688,915

(22) Filed: Nov. 29, 2012

(65) Prior Publication Data

US 2014/0145653 A1   May 29, 2014

(51) Int. Cl.
*H02P 6/18* (2006.01)
*H02P 21/14* (2006.01)

(52) U.S. Cl.
CPC .............. *H02P 6/188* (2013.01); *H02P 21/146* (2013.01)
USPC ....................... 318/400.32; 318/712; 318/721

(58) Field of Classification Search
CPC ......... H02P 6/002; H02P 6/142; H02P 6/188; H02P 6/24
USPC .......... 318/400.02, 400.32, 400.34, 437, 450, 318/459, 479, 504, 705, 712, 720–724
See application file for complete search history.

(56) References Cited

U.S. PATENT DOCUMENTS

| | | | |
|---|---|---|---|
| 3,878,535 A * | 4/1975 | Twiss ............................ | 341/116 |
| 4,746,850 A * | 5/1988 | Abbondanti ................... | 318/723 |
| 5,525,886 A | 6/1996 | Lyons et al. | |
| 6,396,229 B1 | 5/2002 | Sakamoto et al. | |
| 7,045,986 B2 | 5/2006 | Anghel et al. | |
| 7,072,778 B2 * | 7/2006 | Swanson ......................... | 702/57 |
| 7,180,263 B2 | 2/2007 | Maeda et al. | |
| 7,184,927 B2 * | 2/2007 | Anghel et al. ........... | 318/400.04 |
| 7,233,123 B2 | 6/2007 | Koczara et al. | |
| 7,723,933 B2 * | 5/2010 | Fujita et al. ................... | 318/145 |
| 7,800,327 B2 | 9/2010 | Dooley | |
| 8,089,172 B2 | 1/2012 | Li et al. | |

* cited by examiner

*Primary Examiner* — Bentsu Ro
(74) *Attorney, Agent, or Firm* — Finnegan, Henderson, Farabow, Garrett & Dunner LLP

(57) ABSTRACT

A system for estimating a rotor position may include a synchronous machine, including at least one stator winding pair configured to create a magnetic field when an input voltage is applied and a rotor having a field winding and configured to rotate within the magnetic field created by the at least one stator winding pair. The system may include a phase detector configured to determine a phase difference between the input voltage and a field voltage induced in the field winding of the rotor. The system may also include a processor configured to receive a signal from the phase detector indicative of the phase difference between the input voltage and the field voltage, and to estimate the rotor position based on the phase difference.

20 Claims, 5 Drawing Sheets

SYSTEM AND METHOD FOR ESTIMATING THE POSITION OF A WOUND ROTOR SYNCHRONOUS MACHINE

TECHNICAL FIELD

This disclosure relates generally to synchronous machines and, more specifically, to a system and method for estimating the position of a rotor of a wound-rotor synchronous machine.

BACKGROUND

Identifying the position of the rotor of a wound-rotor synchronous machine may be useful for control of the machine in both motoring and generating operational modes. During initialization or startup of synchronous machines, estimating the initial position of the rotor relative to the stators of the machine is desirable for controlling the switching means of the current supplied to the machine. This information may be beneficial for improving the performance of the synchronous machine. For example, the initial position of the rotor may be particularly useful for starting the synchronous machine at maximum torque.

Some synchronous motor systems incorporate sensors, such as encoders and/or resolvers for determining the position of the rotor. However, the presence of an encoder or resolver may increase manufacturing costs and system complexity. Furthermore, these additional components may experience noise interference and performance degradation due to environmental conditions.

One solution for identifying the initial rotor position is described in U.S. Pat. No. 7,233,123 B2 ("the '123 patent"). The '123 patent is directed to a method and system for identifying the position of magnetic poles of a rotor of a multiphase electrical machine relative to a stator of that machine. The method includes the steps of applying a voltage pulse to stator windings of each phase, sensing current flow in the stator windings of each phase due to the application of the voltage pulse to the respective stator windings, and determining the position of the magnetic poles of the rotor relative to the stator using the sensed current flow in the stator windings of each phase. The method is characterized in that the phases of the stator windings are star-connected at a neutral junction, and the voltage pulse is applied to the stator windings of each phase in parallel.

The solution provided by the '123 patent may suffer from a number of possible drawbacks. For example, the '123 patent may only provide a solution for motors with star-connected stator windings and a permanent magnet rotor. Furthermore, the systems and methods proposed in the '123 patent require a wait time to ensure any current flowing in the windings has decayed to zero before applying the voltage pulse. Additionally, the methods and systems in the '123 patent observe the machine inductances, which is only observable in machines with salient features that provide information related to magnetic north or south of the rotor windings.

The presently disclosed systems and methods are directed to overcoming and/or mitigating one or more of the problems set forth above and/or other problems in the art.

SUMMARY

According to one aspect, this disclosure is directed to a system for estimating a rotor position. The system may include a synchronous machine, including at least one stator winding pair configured to create a magnetic field when an input voltage is applied and a rotor having a field winding and configured to rotate within the magnetic field created by the at least one stator winding pair. The system may include a phase detector configured to determine a phase difference between the input voltage and a field voltage induced in the field winding of the rotor. The system may also include a processor configured to receive a signal from the phase detector indicative of the phase difference between the input voltage and the field voltage, and to estimate the rotor position based on the phase difference.

In accordance with another aspect, this disclosure is directed to a computer-implemented method for determining a rotational position of a rotor within a synchronous machine. The method may include applying a three-phase voltage to a plurality of stators of the synchronous machine and determining the voltage applied to each of the plurality of stators and a field voltage induced across windings of the rotor. The method may also include determining phase shifts between the field voltage and each of the applied voltages. The method may also include comparing the phase shifts to a lookup table including a relationship between phase shifts and rotor position to determine the rotational position of the rotor.

According to another aspect, this disclosure is directed to a vehicle include a plurality of axles and a plurality of wheels, each wheel coupled to one of the plurality of axles. The vehicle may also include at least one motor rotatably coupled to one of the plurality of axles, the at least one motor including at least one stator winding pair configured to create a magnetic field when an input voltage is applied and a rotor having a field winding and being configured to rotate within the magnetic field created by the at least one stator winding pair. The vehicle may also include a phase detector configured to determine a phase difference between the input voltage and a field voltage induced in the field winding of the rotor. The vehicle may also include a processor configured to receive a signal from the phase detector indicative of the phase difference between the input voltage and the field voltage, and to estimate the rotor position based on the phase difference.

DETAILED DESCRIPTION

Figure 1:
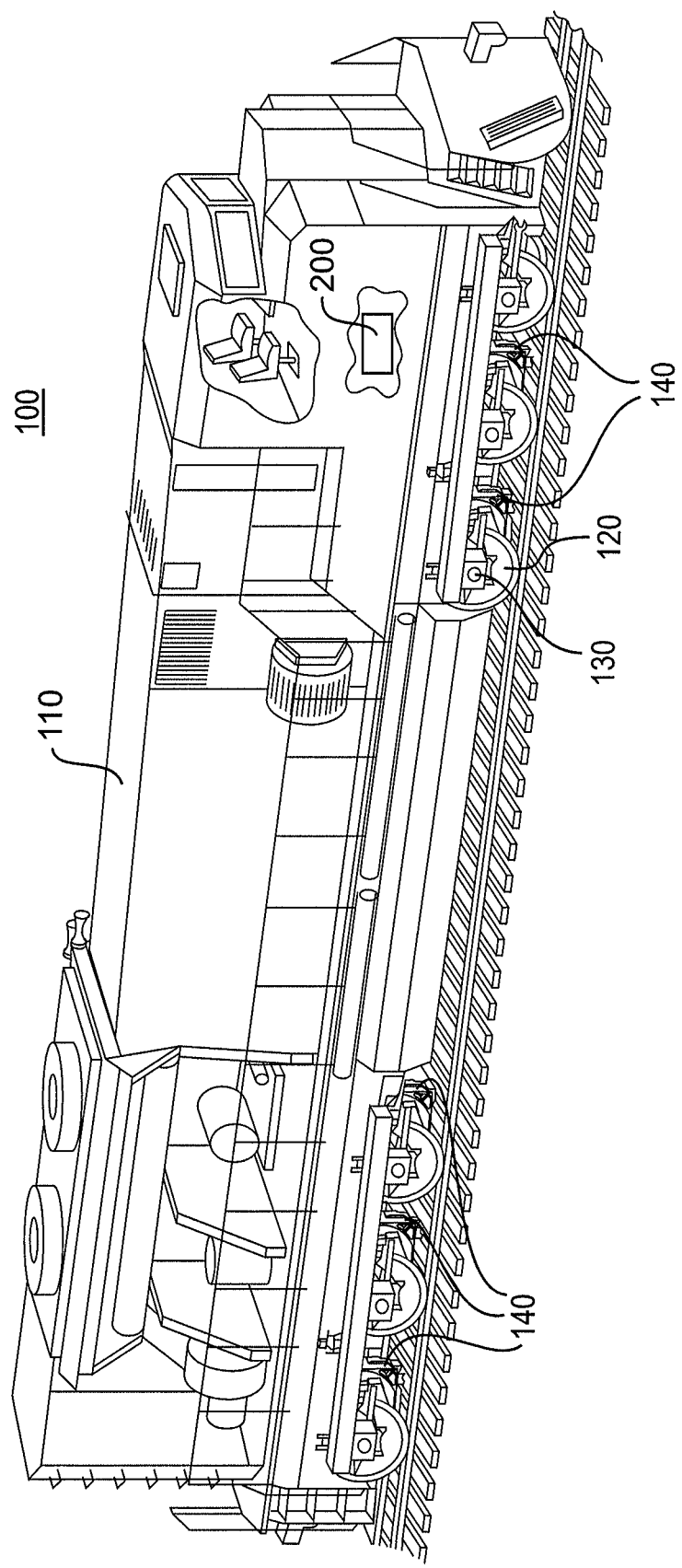
FIG. 1 shows a perspective view of an exemplary embodiment of a vehicle.

FIG. 1 shows an exemplary vehicle 100, for example, a locomotive, in which systems and methods estimating the position of a wound-rotor synchronous machine may be implemented consistent with the disclosed exemplary embodiments. Optionally, vehicle 100 may include an engine 110 for powering components and/or subsystems. Vehicle 100 may be any vehicle having a wound-rotor synchronous machine. For example, vehicle 100 may be any electrically powered rail vehicle employing AC traction motors for propulsion. According to the exemplary embodiment illustrated in FIG. 1, vehicle 100 may include a plurality of pairs of wheels 120, with each pair of wheels 120 being coupled to an axle 130 that is rotatably coupled to a traction motor 140. During powering of exemplary vehicle 100, traction motors 140 may operate to propel vehicle 100. An engine 110 may function to power vehicle 100, including traction motors 140. According to some embodiments, traction motors 140 include a three-phase wound-rotor synchronous machine. Vehicle 100 may include a system 200 for estimating the position (e.g., the initial position) of a rotor of a wound-rotor synchronous machine.

Figure 2:
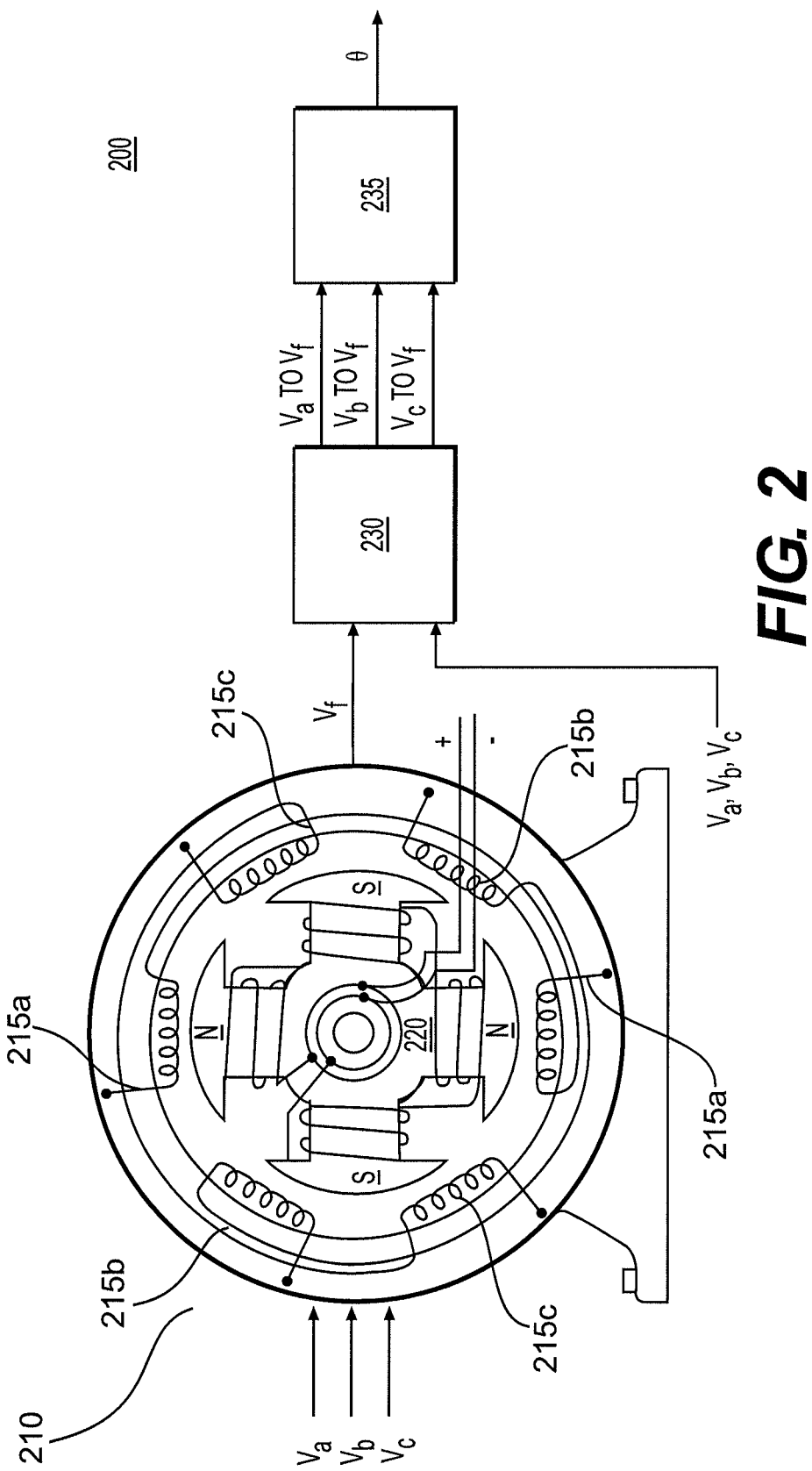
FIG. 2 is a schematic diagram of an exemplary embodiment of a system for estimating a rotor position.

FIG. 2 shows an exemplary embodiment of system 200 for estimating a rotor position. System 200 includes a wound-rotor synchronous machine 210. Machine 210 may be a three-phase balanced synchronous machine. According to some embodiments, machine 210 may include a traction motor 140. Additionally or alternatively, machine 210 may operate as a generator or dynamo. Machine 210 may be a non-excited motor or a direct current (DC) excited motor.

Machine 210 may include a stator winding 215, such as, for example, a three-phase winding. For example, in FIG. 2, machine 210 includes three pairs of stator windings, 215a, 215b, and 215c, respectively. During operation, three-phase voltage may be applied to stator windings 215. The applied voltage is referred to in the figures as Va, Vb, and Vc, respectively. When three-phase voltage is applied, stator windings 215 may produce a rotating magnetic field within machine 210. Machine 210 may also include a rotor 220 that turns within the magnetic field produced by stator winding 215. Rotor 220 may act as a permanent magnet, rotating along with the magnetic field produced by stator winding 215.

According to some embodiments, machine 210 may include an electromagnetic field winding 225. For example, field winding 225 may be wound around rotor 220. When three-phase power is applied to stator winding 215, a field voltage may be induced across field winding 225. The field voltage is referred to in the figures as "Vf." The field voltage may be an alternating current voltage that is out-of-phase with the applied voltages. A relationship between phases of the field voltage and the applied stator voltages may be used to determine the initial position of rotor 220 within machine 210. System 200 may include additional components for determining the phase difference between the applied voltages and the field voltage.

According to some embodiments, system 200 may include a phase detector 230. Phase detector 230 may be a circuit that generates a signal representative of the difference in phase between two signal inputs. Phase detector 230 may receive a command signal indicative of the input voltage associated with at least one stator winding pair 215a, 215b, and/or 215c (respectively, Va, Vb, and/or Vc). Based on input command signals, phase detector 230 may generate three signals representative of the phase differences between each of the applied voltages and the field voltage according to a trilinear coordinate system. For example, phase detector 230 may output signals indicative of the following phase differences: Va to Vf, Vb to Vf, and Vc to Vf. To compare the applied voltages to the field voltage, phase detector 230 may receive each of the voltages as an input. According to some embodiments, phase detector 230 receives the applied voltages directly from machine 210. Additionally or alternatively, system 200 may be designed to provide the applied voltages directly to phase detector 230 from the same voltage source (not shown) as machine 210.

System 200 may include a processor 235 (e.g., a microprocessor) for determining the rotor position based on the outputs of phase detector 230. Processor 235 may embody a single processor or multiple processors that include a means for determining the position of rotor 220 and for communicating with phase detector 230 and/or machine 210. Numerous commercially available processors can be configured to perform the functions of processor 235. It should be appreciated that processor 235 could readily embody a general machine or customized processor capable of controlling the operation of machine 210. Processor 235 may include all the components required to run an application such as, for example, a memory, a secondary storage device, and a processor, such as a central processing unit or any other means known. Various other known circuits may be associated with processor 235, including power source circuitry (not shown) and other appropriate circuitry. Processor 235 may receive one or more signals from phase detector 230 indicative of the phase differences between the applied voltages and the induced field voltage. Based on these inputs, processor 235 may determine the rotor position in terms of electrical degrees. Processor 235 may output this result to other systems associated with machine 210.

Figure 3:
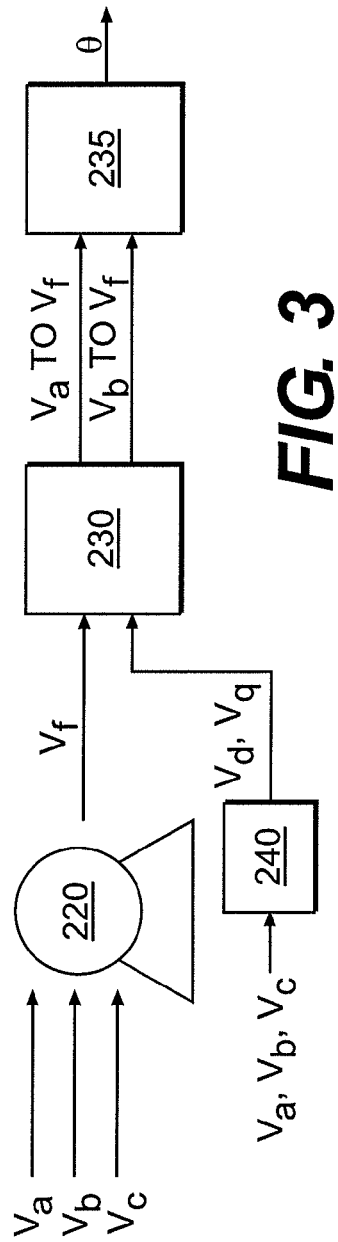
FIG. 3 is a DQ representation of an exemplary embodiment of a wound-rotor synchronous machine.

According to some embodiments, before phase detector 230 determines the phase differences between the applied voltages and the field voltage, the applied voltages are first converted using a transformation. For example, FIG. 3 shows a converter 240 that may be included in system 200 to perform direct-quadrature-zero (dq0 or DQ) transformation on the three-phase applied voltage. For balanced three-phase circuits like machine 210, converter 240 simplifies the three AC quantities, Va, Vb, and Vc of the applied voltage, to two quantities, a d-voltage component Vd and a q-voltage component Vq. Instead of calculating the phase difference between Va, Vb, and Vc and Vf, converter 240 may provide signals to phase detector 230 indicative of Vd and Vq. According to such embodiments, phase detector 230 may only determine two phase differences, rather than three.

Figure 4:
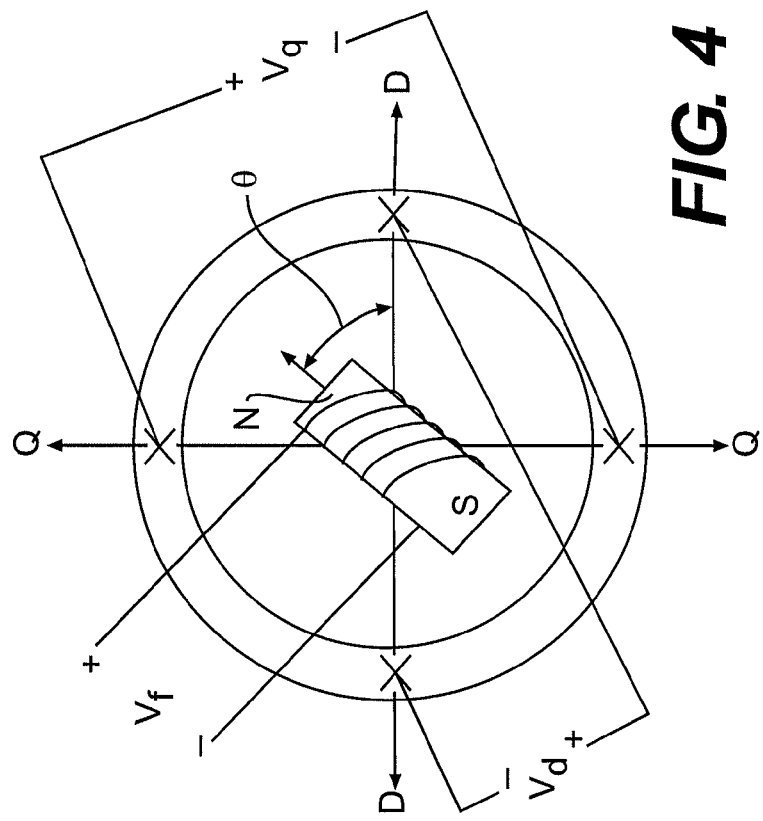
FIG. 4 is a schematic diagram of another exemplary embodiment of a system for estimating a rotor position.

FIG. 4 is an exemplary DQ representation of machine 210 in which the horizontal axis represents the D component of the applied voltages and the vertical axis represents the Q component of the applied voltages. As illustrated by the X's on the axes, Vq is represented by the voltage across two points on the Q axis, and Vd is represented by the voltage across two points on the D axis. The rotor position can be determined by determining the electrical angle θ ("theta electrical") between the D axis and rotor 220. According to some embodiments, processor 235 may be configured to determine the electrical angle θ based on the two phase differences between the applied voltage (in terms of D and Q) and the induced voltage Vf.

Regardless of whether system 200 transforms the applied voltage to a DQ representation, the process by which processor 235 determines theta electrical may be substantially the same. For example, processor 235 may use a lookup table or a closed-form expression to determine theta electrical based on the phase differences between the applied voltage and the field voltage. According to some embodiments, the lookup table or close form expression used to determine theta electrical may be stored in memory accessible to processor 235.

Figure 5:
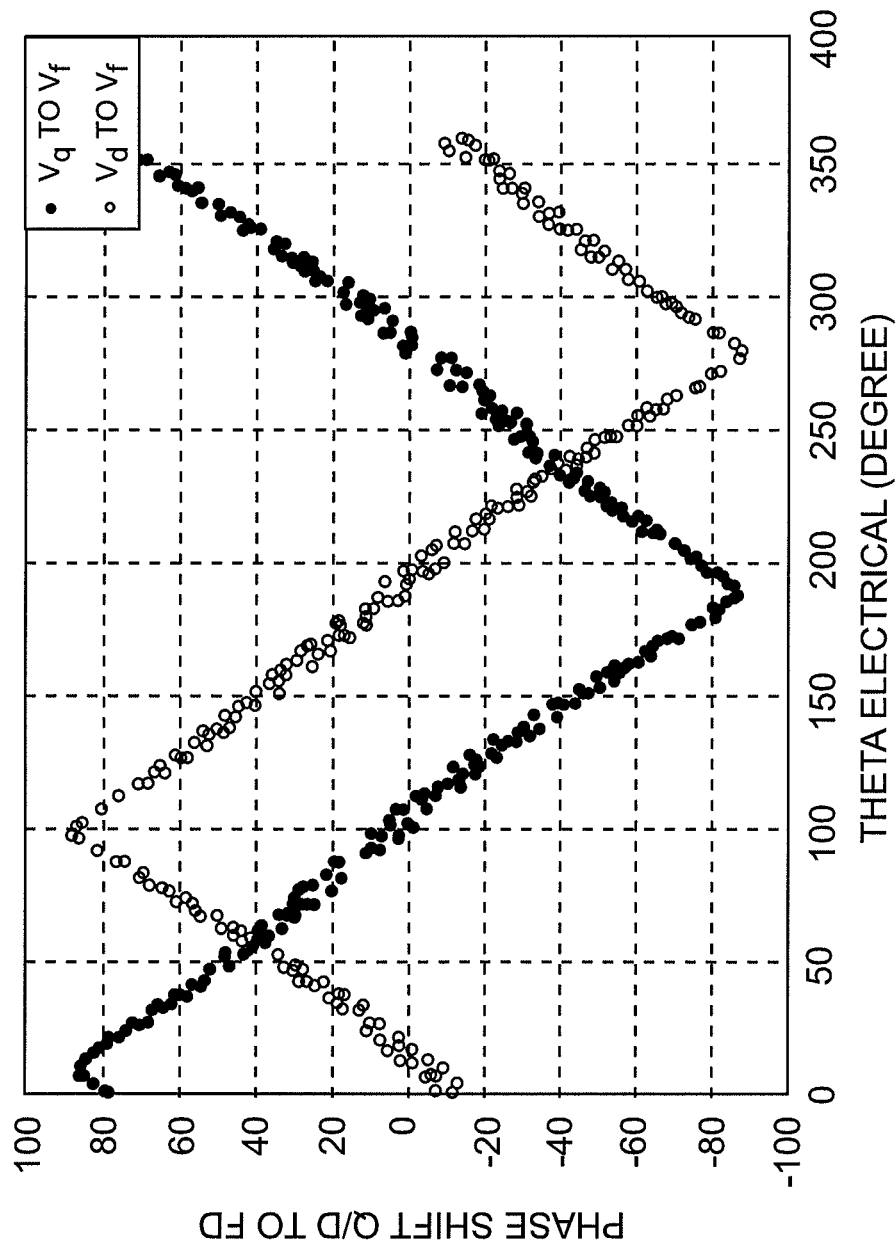
FIG. 5 is a graph illustrating an exemplary relationship between voltage phase shifts and electrical angle, which indicates the position of a rotor.

For example, FIG. 5 illustrates a graphical representation of exemplary correlations stored in an exemplary lookup table for machine 210 with applied voltages in terms of DQ. In FIG. 5, the phase difference is represented by the vertical axis and the corresponding theta electrical is represented by the horizontal axis.

To determine theta electrical based on the data shown in FIG. 5, processor 235 compares the phase differences provided by phase detector 230. For example, if processor 235 receives a signal from phase detector 230 indicating that the phase shift between Vq and Vf is zero and that the phase shift between Vd and Vf is 90 degrees, then processor 235 would determine at which electrical angle both of the phase shift values match the measured phase shifts. For the exemplary data shown in FIG. 5, theta electrical is approximately equal to 100 degrees when Vq to Vf is approximately zero and Vd to Vf is approximately 90 degrees. Similarly, if processor 235 determines the Vq to Vf and Vd to Vf phase shifts are both approximately −40 (negative forty) degrees, processor 235 may determine that theta electrical is approximately 240 degrees for such an example.

Each type of machine 210 may have separate characteristics such that the lookup table or closed form expression varies by machine or group of machines. To create a lookup table and/or closed form expression for a particular machine, the initial position of rotor 220 may be known, and the corresponding phase shifts between the applied voltages and the field voltage may be measured to populate the lookup table. For example, theta electrical may be incremented from 0 to 360 degrees and the corresponding phase shifts between the applied voltages and the field voltage may be measured to populate the lookup table. In this manner, a lookup table may be created for a particular machine 210. For example, a particular application may require a precise determination of theta electrical within five degrees, while another application may only require determining the theta electrical within ten degrees. This lookup table may be populated accordingly.

Figure 6:
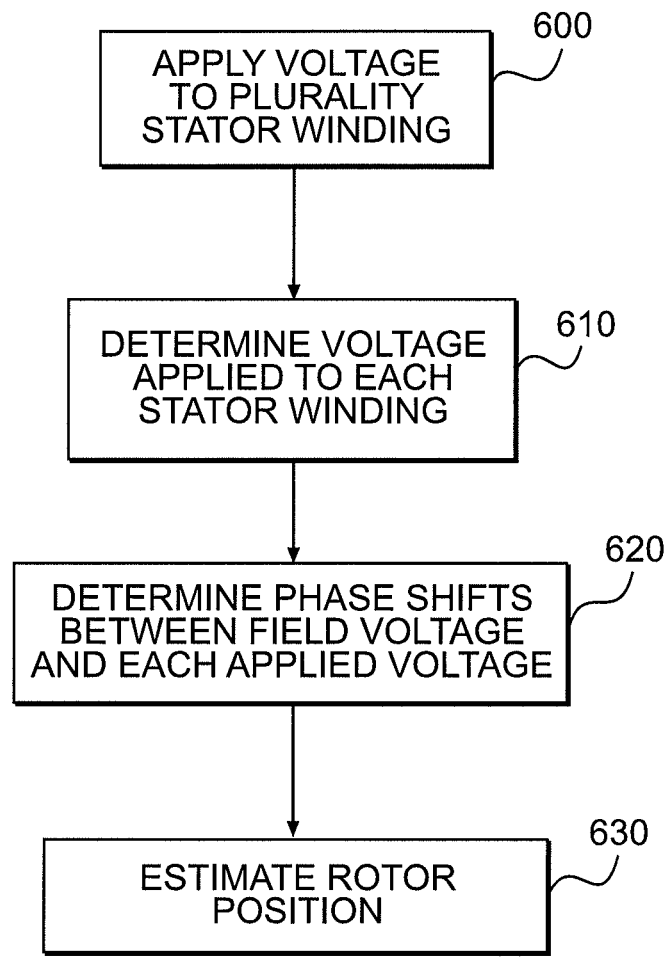
FIG. 6 is a flowchart of an exemplary embodiment method for determining a rotational position of a rotor within a synchronous machine.

FIG. 6 is a flow chart representing an exemplary embodiment of a computer-implemented method for determining a rotational position of rotor 220 within machine 210. The different steps of this method may be practiced by processor 235 alone or in cooperation with other components of system 200.

To begin the process, at step 600, system 200 may cause a three-phase voltage to be applied to stator windings 215 of machine 210. At step 610, system 200 may determine the voltage applied to each stator winding. According to some embodiments, step 610 may only require determining the phases associated with the three-phase voltage. System 200 may also determine a phase shift between the field voltage and each of the applied voltages at step 620. As discussed above, phase detector 230 may be used to complete all or a portion of steps 610 and/or 620. The phase shifts may be determined between the field voltage and each of the applied voltages based on the trilinear coordinate system. Alternatively, the method may include the optional steps of transforming the three-phase input voltages to the DQ coordinate system using converter 240. Thereafter, phase detector 230 may determine the phase shifts based on the DQ coordinate system as discussed above with reference to FIGS. 3-5.

At step 630, system 200 estimates rotor position. For example, system 200 may estimate rotor position based on the phase difference between input voltage and field voltage. For example, system 200 may compare the phase shifts to values stored in a lookup table or a closed form expression to estimate the position of rotor 220. According to some embodiments, the rotational position may be expressed as an electrical angle relative to the d-axis of the DQ coordinate system. According to some embodiments, once the position of rotor 220 is estimated, system 200 may control the power applied to each of the stator windings based on the rotational position of the rotor.

INDUSTRIAL APPLICABILITY

The disclosed systems and methods may provide a solution for identifying the rotational position (e.g., the initial position) of a rotor with respect to the stators of a wound-rotor synchronous machine. The presently disclosed consist may have several advantages. With the disclosed systems and methods, the synchronous machine may not need a salient feature that provides information regarding magnetic north or south of the rotor winding. Additionally, the disclosed systems and methods may be customized based on the particular characteristics and requirements of the synchronous machine. For example, data correlations between phase shift and theta electrical may be approximated for similar machines to save costs when precision is not as desirable for a particular application. Similarly, data correlations may be made more or less precise, for example, by adjusting the frequency at which measurements are taken to populate a lookup table.

It will be apparent to those skilled in the art that various modifications and variations can be made to the disclosed system for estimating the rotational position of a rotor within a synchronous machine and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for estimating a rotor position, comprising:
a synchronous machine, including:
at least one stator winding pair configured to create a magnetic field when an input voltage is applied; and
a rotor having a field winding and configured to rotate within the magnetic field created by the at least one stator winding pair;
a phase detector configured to determine the phase difference between the input voltage and a field voltage induced in the field winding of the rotor; and
a processor configured to receive a signal from the phase detector indicative of a phase difference between the input voltage and the field voltage and to estimate the rotor position based on the phase difference.

2. The system of claim 1, wherein the synchronous machine includes a three-phase balanced synchronous machine.

3. The system of claim 1, wherein the phase detector is configured to receive a command signal indicative of the input voltage associated with the at least one stator winding pair and determine the phase difference.

4. The system of claim 1, wherein the at least one stator winding pair includes three stator winding pairs, and the processor is configured to estimate the rotor position based on the phase differences between each of the three stator winding pairs and the field voltage.

5. The system of claim 4, wherein the processor is configured to use a lookup table to estimate the rotor position based on the phase differences.

6. The system of claim 4, further including a converter configured to transform the three input voltages to a q-voltage component and a d-voltage component, and wherein the phase detector determines a D phase shift based on the d-voltage component and the field voltage, and determines a Q phase shift based on the q-voltage component and the field voltage.

7. The system of claim 6, wherein the processor is configured to use a lookup table to estimate the rotor position based on at least one of the D phase shift and the Q phase shift.

8. The system of claim 7, wherein the processor is further configured to control the synchronous machine based on the rotor position.

9. A computer-implemented method for determining a rotational position of a rotor within a synchronous machine, the method comprising:
applying three-phase voltage to a plurality of stators of the synchronous machine;
determining the voltage applied to each of the plurality of stators and a field voltage induced across windings of the rotor;
determining phase shifts between the field voltage and each of the applied voltages; and
comparing the phase shifts to a lookup table or closed form expression including a relationship between phase shifts and rotor position to determine the rotational position of the rotor.

10. The method of claim 9, wherein determining phase shifts between the field voltage and each of the applied three-phase voltages is based upon a trilinear coordinate system.

11. The method of claim 9, further including:
transforming the three-phase input voltages to a d-q coordinate system such that the input voltages are converted to a d-voltage component and a q-voltage component, wherein determining the phase shifts between the field voltage and each of the applied voltages is based on the d-voltage component and the q-voltage component.

12. The method of claim 11, wherein the rotational position of the rotor is represented by an electrical angle relative to a d-axis of the d-q coordinate system.

13. The method of claim 9, further including controlling power applied to each of the stators based on the rotational position of the rotor.

14. The method of claim 11, wherein the rotor is electromagnetic.

15. A vehicle, comprising:
a plurality of axles;
a plurality of wheels, each wheel coupled to one of the plurality of axles;
at least one motor rotatably coupled to one of the plurality of axles and including at least one stator winding pair configured to create a magnetic field when an input voltage is applied and a rotor having a field winding and being configured to rotate within the magnetic field created by the at least one stator winding pair;
a phase detector configured to determine a phase difference between the input voltage and a field voltage induced in the field winding of the rotor; and
a processor configured to receive a signal from the phase detector indicative of the phase difference between the input voltage and the field voltage and to estimate the rotor position based on the phase difference.

16. The vehicle of claim 15, wherein the at least one motor includes a three-phase balanced synchronous machine.

17. The vehicle of claim 15, wherein the phase detector is configured to receive a command signal indicative of the input voltage associated with the at least one stator winding pair and determine the phase difference.

18. The vehicle of claim 15, wherein the at least one stator winding pair includes three stator winding pairs, and the processor is configured to estimate the rotor position based on the phase differences between each of the three stator winding pairs and the field voltage.

19. The vehicle of claim 18, wherein the processor is configured to use at least one of a lookup table and a closed form expression to estimate the rotor position based on the phase differences.

20. The system of claim 18, further including a converter configured to transform the three input voltages to a q-voltage component and a d-voltage component, and wherein the phase detector determines a D phase shift based on the d-voltage component and the field voltage, and determines a Q phase shift based on the q-voltage component and the field voltage.

* * * * *